United States Patent [19]
Nakazawa

[11] Patent Number: 5,964,510
[45] Date of Patent: Oct. 12, 1999

[54] PUMP UNIT AND BRAKE CONTROL DEVICE USING SAME

[75] Inventor: Chiharu Nakazawa, Kawasaki, Japan

[73] Assignee: Unisia Jecs Corporation, Atsugi, Japan

[21] Appl. No.: 08/880,298

[22] Filed: Jun. 24, 1997

[30] Foreign Application Priority Data

Jun. 27, 1996 [JP] Japan ..................................... 8-167052

[51] Int. Cl.[6] .................................................. B60T 8/40
[52] U.S. Cl. ................ 303/116.4; 417/2; 417/3
[58] Field of Search ............................. 303/116.4, 115.1, 303/115.4, 116.2, 113.2; 417/2, 18, 214, 3, 45, 53, 63, 265

[56] References Cited

U.S. PATENT DOCUMENTS

| | | | |
|---|---|---|---|
| 3,032,995 | 5/1962 | Knowles | 303/24.1 |
| 3,276,822 | 10/1966 | Lister et al. | 303/24.1 |
| 3,574,416 | 4/1971 | Skoyles | 303/116.4 |
| 4,099,793 | 7/1978 | Iio | 303/116.4 |
| 4,552,513 | 11/1985 | Miller et al. | 417/18 |
| 4,681,513 | 7/1987 | Saito et al. | 417/2 |
| 4,808,077 | 2/1989 | Kan et al. | 417/2 |
| 4,810,168 | 3/1989 | Nogami et al. | 417/2 |
| 5,114,314 | 5/1992 | Fujimoto | 417/3 |
| 5,131,730 | 7/1992 | Kollers et al. | 303/113.2 |
| 5,165,764 | 11/1992 | Miyake et al. | 303/113.2 |
| 5,207,485 | 5/1993 | Troster | 303/113.2 |
| 5,320,498 | 6/1994 | Fuchida | 417/214 |
| 5,401,083 | 3/1995 | Altmann et al. | 303/113.2 |
| 5,586,814 | 12/1996 | Steiner | 303/116.2 |

FOREIGN PATENT DOCUMENTS

| | | |
|---|---|---|
| 26 46 583 | 4/1978 | Germany . |
| 40 17 874 | 12/1991 | Germany . |
| 53-49305 | 5/1978 | Japan . |
| 4-231255 | 8/1992 | Japan . |
| 7-81540 | 3/1995 | Japan . |

*Primary Examiner*—Robert J. Oberleitner
*Assistant Examiner*—Melanie Talavera
*Attorney, Agent, or Firm*—Foley & Lardner

[57] ABSTRACT

A pump unit includes a first plunger pump including a suction port arranged at an end of the first pump distant from a camshaft and a discharge port arranged at another end thereof near the camshaft, and a plunger second pump including a suction port arranged at an end of the second pump near the camshaft and a discharge port arranged at another end thereof distant from the camshaft. The first and second pumps are arranged in parallel with each other along the camshaft so that plungers of the first and second pumps contact corresponding cams of the camshaft. The first and second pumps are connected in series so that the discharge port of the first pump communicates with the suction port of the second pump.

4 Claims, 5 Drawing Sheets

PUMP UNIT AND BRAKE CONTROL DEVICE USING SAME

BACKGROUND OF THE INVENTION

The present invention relates generally to a pump unit including two plunger pumps connected in series and arranged in parallel, and more particularly to a brake control device using same for achieving restrained slippage and prevented lock of wheels of motor vehicles.

When the driving wheels undergo excessive driving torque due to acceleration, sudden change in road conditions, etc., a slippage may occur between the driving wheels and a road causing an ineffective transmission of engine torque to the road. Moreover, upon braking of a motor vehicle carried out suddenly or on a frozen road, the wheels undergo excessive braking force, and are thus apt to be locked. With the wheels locked, control of the vehicle is extremely difficult.

In order to restrain slip rotation (refer hereafter to as "acceleration slip") of the driving wheels and to prevent (refer hereafter to as "braking slip") the wheels from locking upon braking, JP-A 4-231255 proposes a braking device wherein a braking pressure is controlled with respect to a wheel cylinder of each wheel.

For obtaining quick restraint of acceleration slip of the driving wheels, etc., this braking device comprises a main pump and an auxiliary pump arranged in series, the former feeding brake fluid to the wheel cylinders of the driving and driven wheels, the latter being connected to a master cylinder. A brake-fluid return passage has one end connected to the wheel cylinders, and another end connected to a brake-fluid passage for fluid communication between the main pump and the auxiliary pump. A check valve is arranged to the return passage to prevent flow of brake fluid from the auxiliary pump to the wheel cylinders through the return passage. A reservoir tank is arranged to the return passage between the check valve and the wheel cylinders to temporarily accumulate brake fluid out of the wheel cylinders.

When acceleration slip occurs, the main pump and the auxiliary pump are actuated to feed brake fluid within the master cylinder to the wheel cylinders of the driving or driven wheels, thereby restraining excessive slippage of the driving wheels to achieve effective transmission of engine torque to the road.

An example of a pump unit including the above main pump and auxiliary pump arranged in series is seen, e.g. in JP 53-49305. This pump unit comprises two plunger pumps arranged in line along a camshaft, a discharge port of the upstream-side plunger pump being connected to a suction port of the downstream-side plunger pump so that fluid inhaled from a suction port of the upstream-side plunger pump with rotation of the camshaft is fed to the suction port of the downstream-side plunger pump through the discharge port of the upstream-side plunger pump, and fluid inhaled into the downstream-side plunger pump is discharged from the discharge port thereof.

However, the conventional pump unit as disclosed in JP 53-49305 has a drawback in that the suction and discharge ports of each plunger pump are arranged at ends thereof opposite to the camshaft makes the layout of the brake-fluid passage communicating with each suction and discharge port complicated. Moreover, the pump unit becomes extremely long in the plunger reciprocating direction, enlarging a casing thereof, resulting in not only deteriorated mounting performance to the vehicles, but increased weight and manufacturing cost.

It is, therefore, an object of the present invention to provide a pump unit with reduced size and weight. Another object of the present invention is to provide a brake control device using such pump unit.

SUMMARY OF THE INVENTION

According to one aspect of the present invention, there is provided a pump unit, comprising:
a camshaft including first and second cams;
first and second pumps, each including a plunger;
first suction and discharge ports formed in said first pump, wherin said first suction port is arranged at an end of said first pump distant from said camshaft and said first discharge port is arranged at another end of said first pump near said camshaft; and
second suction and discharge ports formed in said second pump, wherein said second suction port is arranged at an end of said second pump near said camshaft and said second discharge port is arranged at another end of said second pump distant from said camshaft,
wherein said first and second pumps are arranged in parallel with each other along said camshaft so that said plungers of said first and second pumps contact said first and second cams of said camshaft, respectively, and
wherein said first and second pumps are connected in series so that said first discharge port communicates with said second suction port.

Another aspect of the present invention lies in providing a system for controlling a brake of a vehicle through master and wheel cylinders, comprising:
a main passage;
a reservoir tank communicating with said main passage;
an auxiliary passage having one end communicating with said main passage and another end communicating with said reservoir tank;
a return passage having one end communicating with said auxiliary passage and another end communicating with said main passage;
a first valve arranged in said main passage and connecting the master cylinder and the wheel cylinder;
a second valve arranged in said main passage between the wheel cylinder and said first valve;
a pump unit having:
   a camshaft including first and second cams;
   main and auxiliary pumps, each including a plunger,
      wherein said main pump is arranged in said auxiliary passage and discharges a brake fluid into said main passage, and
      wherein said auxiliary pump is arranged in said auxiliary passage between said main pump and said reservoir tank and discharges said brake fluid into said main pump;
   first suction and discharge ports formed in said auxiliary pump, wherein said first suction port is arranged at an end of said auxiliary pump distant from said camshaft and said first discharge port is arranged at another end of said auxiliary pump near said camshaft; and
   second suction and discharge ports formed in said main pump, wherein said second suction port is arranged at an end of said main pump near said camshaft and said second discharge port is arranged at another end of said main pump distant from said camshaft, wherein said main and auxiliary pumps are arranged in parallel with each other along said camshaft so that said plungers of said main and auxiliary pumps contact said first and second cams of said camshaft, and wherein said main and auxiliary pumps are connected in series so that said first discharge port communicates with said second suction port;

a third valve arranged in said auxiliary passage between said auxiliary pump and said reservoir tank;

a fourth valve arranged in said return passage, wherein said return passage communicates with said auxiliary passage between said main pump and said auxiliary pump and communicates with said main passage between the wheel cylinder and said second valve;

a check valve arranged in said return passage at one end distant from said fourth valve, wherein said check valve prevents said brake fluid from flowing from said auxiliary pump to said return passage;

a motor connected to said pump unit, wherein said motor simultaneously drives said main and auxiliary pumps; and a control unit connected to said first to fourth valves and said motor, wherein said control unit controls said first to fourth valves and said motor.

DETAILED DESCRIPTION OF THE INVENTION

Figure 1:
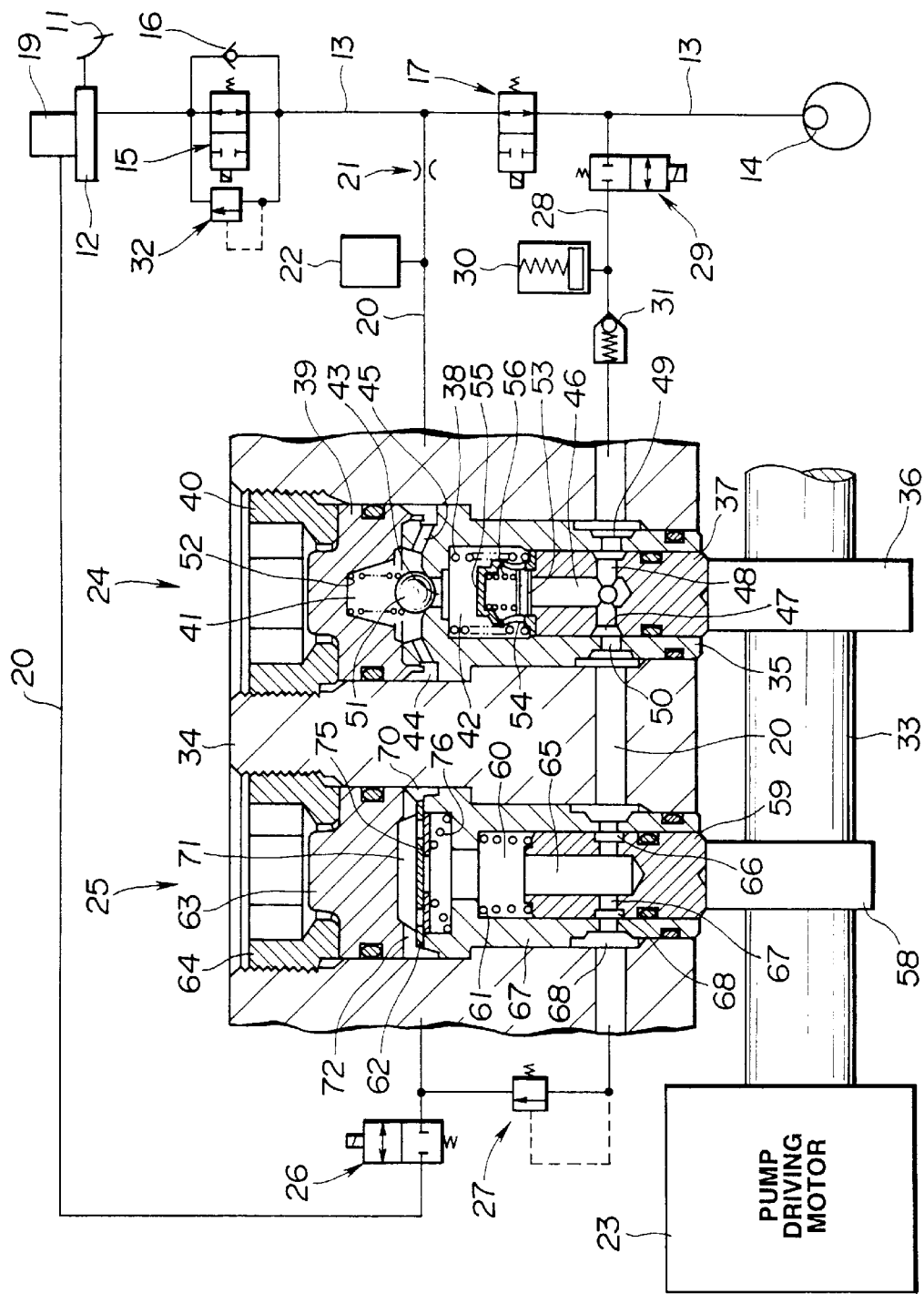
FIG. 1 is a schematic diagram with enlarged section showing an embodiment of a brake control device with a pump unit.
Figure 2:
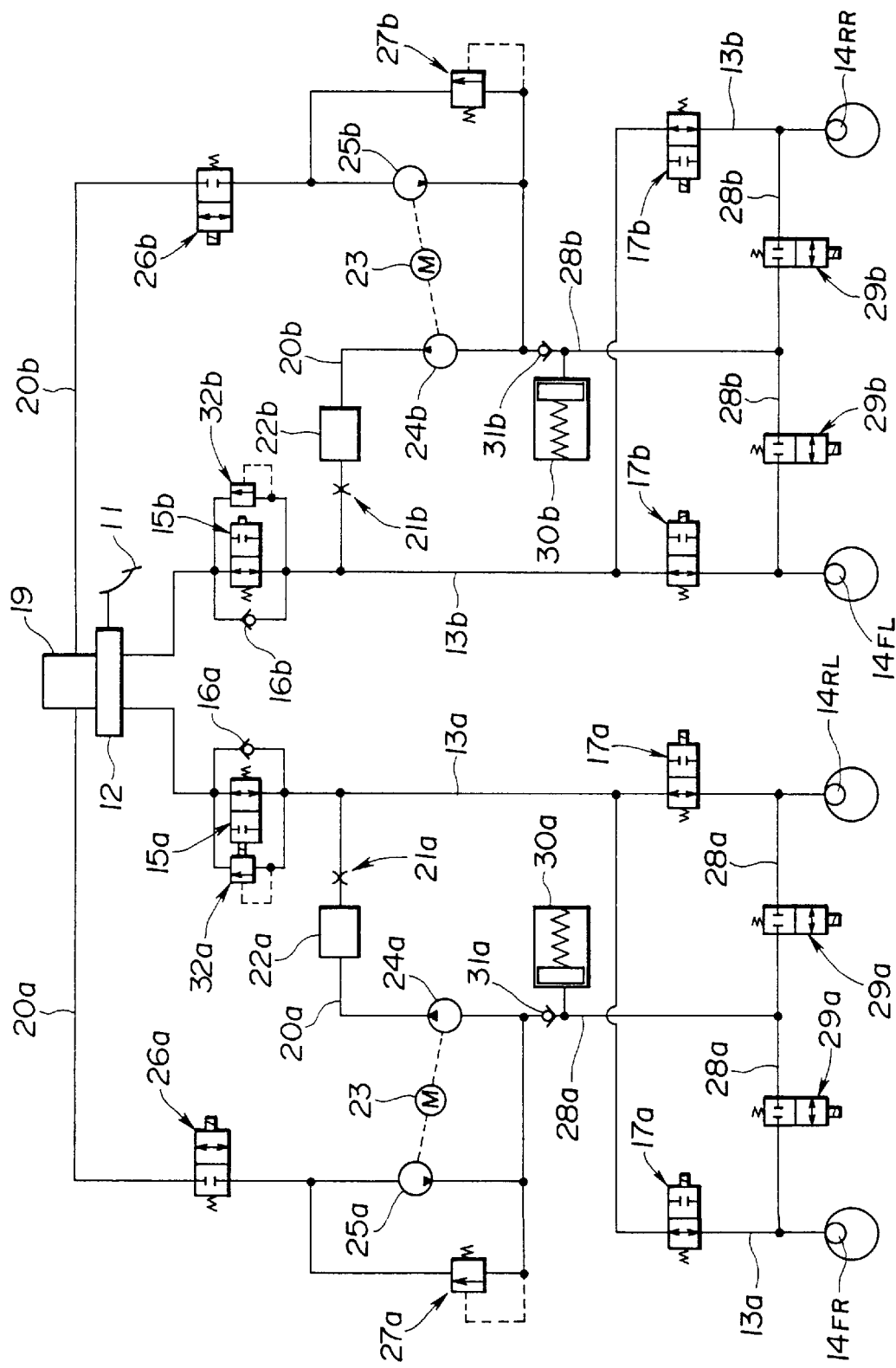
FIG. 2 is a circuit diagram showing a brake-fluid circuit of the brake control device.

Referring to the drawings, a preferred embodiment of a brake control device with a pump unit will be described. Referring to FIG. 1–2, a brake control device comprises two main brake-fluid passages 13a, 13b (refer hereafter in some cases to as "13"), each having one end communicating with a master cylinder 12 connected to a brake pedal 11 depressed by a driver, and the other end communicating with a respective wheel cylinder $14_{FR}$, $14_{FL}$ of a right front wheel and a left rear wheel, and wheel cylinder $14_{FL}$, $14_{FR}$ of a left front wheel and a right rear wheel.

Arranged to the main brake-fluid passages 13 in parallel are electromagnetic selector valves 15a, 15b (refer hereafter to as "15") for braking slip as a first valve, which are opened when turned off, and first check valves 16a, 16b (refer hereafter to as "16") for preventing counterflow of brake fluid from the wheel cylinders $14_{FR}$, $14_{FL}$, $14_{FL}$, $14_{FR}$, (refer hereafter in some cases to as "14") to the master cylinder 12. Moreover, arranged to the main brake-fluid passages 13 between the selector valves 15/first check valves 16 and the wheel cylinders 14 to correspond to the wheel cylinders 14 are electromagnetic selector valves 17a, 17b (refer hereafter to as "17") for supply of brake fluid, which are opened when turned off.

The braking-slip selector valves 15 are generally held in the always-open state, but are closed, when a motor vehicle produces acceleration slip of the driving wheels or comes near to spinning, in accordance with a command of a control unit 18 as will be described later. The supply selector valves 17 are generally held in the always-open state, but are closed, upon occurrence of braking slip, to maintain or reduce brake-fluid pressures within the wheel cylinders 14 in accordance with a command of the control unit 18.

Thus, when the driver depresses the brake pedal 11, a brake-fluid pressure produced in the master cylinder 12 is transmitted to the wheel cylinders 14 through the braking-slip selector valves 15, the main brake-fluid passages 13, and the supply selector valves 17, producing a braking force corresponding to the brake-fluid pressure.

Moreover, the brake control device comprises two auxiliary brake-fluid passages 20a, 20b (refer hereafter to as "20"), each having one end communicating with a first reservoir tank 19 connected to the master cylinder 12, and the other end communicating with the main brake-fluid passages 13 between the braking-slip selector valves 15/first check valves 16 and the supply selector valves 17. Arranged to the auxiliary brake-fluid passages 20 in series in the order as viewed from the main brake-fluid passages 13 are orifices 21a, 21b (refer hereafter to as "21"), damper tanks 22a, 22b (refer hereafter to as "22") for restraining surging of brake fluid which flows in the auxiliary brake-fluid passages 20, main pumps 24a, 24b (refer hereafter to as "24") operated by a pump driving motor 23 to feed brake fluid to the main brake-fluid passages 13, auxiliary pumps 25a, 25b (refer hereafter to as "25") driven together with the main pumps 24 to feed thereto brake fluid within the first reservoir tank 19, and electromagnetic selector valves 26a, 26b as a second valve (refer hereafter to as "26") for acceleration slip, which are closed when turned off.

The acceleration-slip selector valves 26 are generally held in the always-closed state, but are opened, when the vehicle produces acceleration slip of the driving wheels or comes near to spinning, in accordance with a command of the control unit 18.

Moreover, arranged to the auxiliary brake-fluid passages 20 in parallel with the auxiliary pumps 25 are relief valves 27a, 27b (refer hereafter to as "27") for maintaining brake-fluid pressures within the auxiliary brake-fluid passages 20 between the main pumps 24 and the auxiliary pumps 25 at a predetermined value or less.

Brake-fluid return passages 28a, 28b (refer hereafter to as "28") have one end communicating with the auxiliary brake-fluid passages 20 between the main pumps 24 and the auxiliary pumps 25, and the other end communicating with the main brake-fluid passages 13 between the wheel cylinders 14 and the supply selector valves 17, respectively. Arranged at the other end of each auxiliary brake-fluid passage 20, to correspond to the wheel cylinders 14, is an electromagnetic selector valve 29a, 29b (refer hereafter to as "29") for discharging brake fluid, which is closed when turned off.

The discharge selector valves 29 are generally held in the always-closed state, but are opened, upon occurrence of braking slip, to reduce brake-fluid pressures within the wheel cylinders 14 in accordance with a command of the control unit 18.

Arranged at the one end of each brake-fluid return passages 28 in the order as viewed from the discharge selector valves 29 are auxiliary reservoir tanks 30a, 30b (refer hereafter in some cases to as "30") and second check valves 31a, 31b (refer hereafter to as "31") for preventing counterflow of brake fluid from the auxiliary brake-fluid passages 20 to the brake-fluid return passages 28.

In this embodiment, relief valves 32a, 32b are arranged to the main brake-fluid passages 13 in parallel with the braking-slip selector valves 15 and the first check valves 16 so as to maintain at a predetermined value or less brake-fluid pressures within the main brake-fluid passages 13 nearer the supply selector valves 17 than the braking-slip selector valves 15 and the first check valves 16.

Referring to FIG. 1, a more detailed description will be made with regard to the structure of the main pumps 24 and the auxiliary pumps 25. Each main pump 24 and auxiliary pump 25 is disposed with 180° shift along the camshaft 33 of the pump driving motor 23, and are accommodated in a casing 34.

Each main pump 24 as a second pump comprises a cup-like cylinder 35 having one end held by the casing 34, a plunger 37 slidably engaged with one end of the cylinder 35 and having one end face which contacts an eccentric cam 36 as a second cam arranged to the camshaft 33, a compression spring 38 interposed between the cylinder 35 and the plunger 37 for biasing the plunger 37 to the eccentric cam 36, a cup-like cylinder keeper 39 engaged with the casing 34 to hold the other end of the cylinder 35, and a lock nut 40 engaged with the casing 34 for fixing the cylinder 35 and the cylinder keeper 39 to the casing 34.

Formed in the center of the other end of the plunger 37 are a discharge-side fluid chamber 41 defined by the other end face of the cylinder 35 and the cylinder keeper 39, and a communication hole 43 which opens to a cylinder chamber 42 defined by the other end of the cylinder 35 and the other end face of the plunger 37. An annular clearance 44 defined by the casing 34, the cylinder 35, and the cylinder keeper 39 communicates with the auxiliary brake-fluid passage 20 as a first communication passage. The annular clearance 44 as a discharge port of the second pump and the discharge-side fluid chamber 41 communicate with each other through a communication hole 45 formed at the other end of the cylinder 35.

On the other hand, formed in the center of the plunger 37 is a blind hole 46 which opens to the cylinder chamber 42. The blind hole 46 has a bottom formed with communication holes 48 which communicate with an annular groove 47 formed at the outer periphery of the plunger 37. Moreover, formed at the one end of the cylinder 35 at the outer periphery is an annular groove 49 communicating with the brake-fluid return passage 28, whereas formed radially at the one end thereof are communication holes 50 each having the outer periphery communicating with the annular groove 49 as a suction port of the second pump and the inner periphery communicating with the annular groove 47 of the plunger 37. It is noted that, in order to always ensure communication of the communication holes 50 of the cylinder 35 with the annular groove 47 of the plunger 37 even with the plunger 37 reciprocating with respect to the cylinder 35 by rotation of the eccentric cam 36 integrated with the camshaft 33, the dimensions and shapes of the communication holes 50 and the annular groove 47 are determined appropriately.

Accommodated in the discharge-side fluid chamber 41 are a discharge valve ball 51 as a discharge valve which can close the communication hole 43, and a compression spring 52 for biasing the discharge valve ball 51 against the communication hole 43. Likewise, accommodated in the cylinder chamber 42 are a suction valve plate 53 as a suction valve which can close the blind hole 46 of the plunger 37, a cup-like valve-plate holder 55 for slidably holding the suction valve plate 53 and having a communication hole 54 formed on the periphery, and a compression spring 56 interposed between the valve-plate holder 55 and the suction valve plate 53 for biasing the suction valve plate 53 to the blind hole 46. The valve-plate holder 55 is always pressed on the other end face of the plunger 37 by the compression spring 38.

Thus, when the plunger 37 is moved to the cylinder keeper 39 by rotation of the eccentric cam 58 integrated with the camshaft 33, the volume of the cylinder chamber 42 is decreased, which produces a differential pressure between the cylinder chamber 42 and the discharge-side fluid chamber 41, so that the valve ball 51 is displaced to part from the cylinder 35, discharging brake fluid within the cylinder chamber 42 from the auxiliary brake-fluid passage 20 to the main brake-fluid passage 13 through the discharge-side fluid chamber 41. On the other hand, when the plunger 37 is moved to the camshaft 33, the volume of the cylinder chamber 42 is increased, which produces a differential pressure between the blind hole 46 and the cylinder chamber 42, so that the suction valve plate 53 is displaced in the valve-plate holder 55 to part from the plunger 37, inhaling brake fluid within the auxiliary pump 25 and the brake-fluid return passage 28 into the cylinder chamber 42.

In such a way, with reciprocating motion of the plunger 37, brake fluid is intermittently discharged from the main pump 24 to the main brake-fluid passage 13.

Each auxiliary pump 25 as a first pump comprises a cup-like cylinder 57 having one end held by the casing 34, a plunger 59 slidably engaged with one end of the cylinder 57 and having one end face which contacts an eccentric cam 58 as a first cam arranged to the camshaft 33, a compression spring 61 arranged in a cylinder chamber 60 defined by the plunger 59 and the cylinder 57 for biasing the plunger 59 to the eccentric cam 58, a cup-like cylinder keeper 63 engaged with the casing 34 to contact the other end of the cylinder 57 through a stationary valve plate 62, and a lock nut 64 engaged with the casing 34 for fixing the cylinder 57 and the cylinder keeper 63 to the casing 34.

Formed in the center of the plunger 59 is a blind hole 65 which opens to the cylinder chamber 60. The blind hole 65 has a bottom formed with communication holes 67 which communicate with an annular groove 66 formed at the outer periphery of the plunger 59. Moreover, formed at the one end of the cylinder 57 at the outer periphery is an annular groove 68 communicating with the auxiliary brake-fluid passage 20 as a second communication passage, whereas formed radially at the one end thereof are communication holes 69 each having the outer periphery communicating with the annular groove 68 as a discharge port of the first pump and the inner periphery communicating with the annular groove 66 of the plunger 59. It is noted that, in order to always ensure communication of the communication holes 69 of the cylinder 57 with the annular groove 66 of the plunger 59 even with the plunger 59 reciprocating with respect to the cylinder 57 by rotation of the eccentric cam 58 integrated with the camshaft 33, the dimensions and shapes of the communication holes 69 and the annular groove 66 are determined appropriately.

Figure 3:
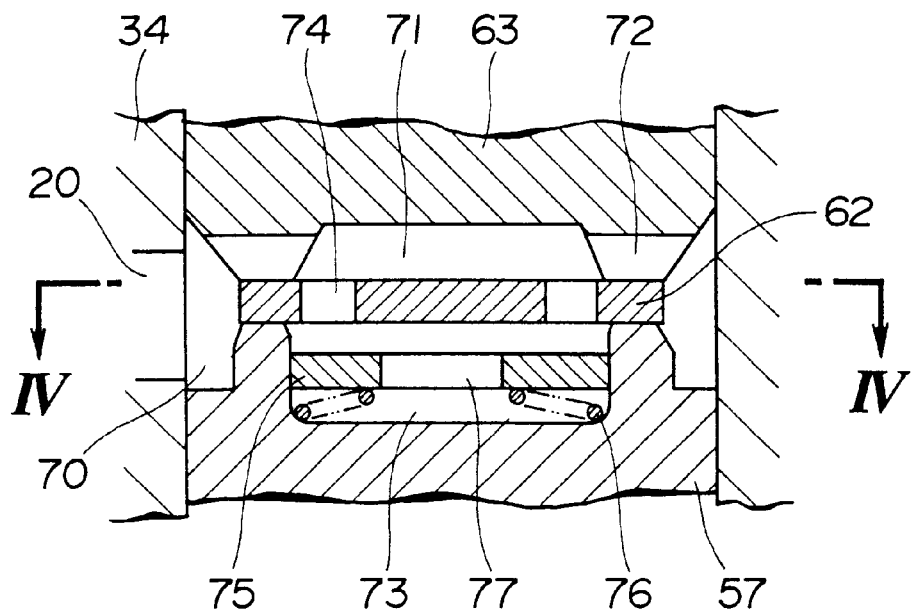
FIG. 3 is a fragmentary enlarged section showing a stationary valve plate as shown in FIG. 1.
Figure 4:
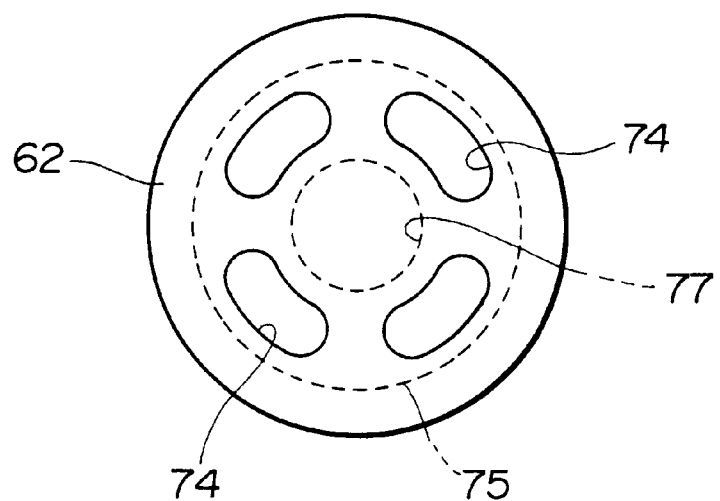
FIG. 4 is a sectional view taken along the line IV—IV in FIG. 3.

Referring to FIGS. 1 and 3–4, an annular clearance defined by the casing 34, the cylinder 57, the stationary valve plate 62, and the cylinder keeper 63 communicate with the auxiliary brake-fluid passage 20 as a third communication passage. Moreover, the annular port 70 as a suction port of the first pump and a suction-side fluid chamber 71 defined by the stationary valve plate 62 and the cylinder keeper 63 communicate with each other through communication grooves 72 which are radially formed in the cylinder keeper 63.

The stationary valve plate 62 is formed with circular communication holes 74 for ensuring communication between a stepped hole 73 formed at the other end of the cylinder 57 and the suction-side fluid chamber 71. A movable valve plate 75 is slidably engaged with the stepped hole 73, and a compression spring 76 is arranged to bias the movable valve plate 75 against the stationary valve plate 62 so as to close the communication holes 74 of the stationary valve plate 62. Formed in the center of the movable valve plate 75 is a communication hole 77 which opens to the cylinder chamber 60.

Thus, when the plunger 59 is moved to the cylinder keeper 63 by rotation of the eccentric cam 58 integrated with the camshaft 33, the volume of the cylinder chamber 60 is decreased, which makes the stationary valve plate 62 closely contact the movable valve plate 75 as shown in FIG. 1 to close the communication holes 74, 77, thereby discharging brake fluid within the cylinder chamber 60 from blind hole 65 to the main pump 24 through the auxiliary brake-fluid passage 20. On the other hand, when the plunger 59 is moved to the camshaft 33, the volume of the cylinder chamber 60 is increased, which produces a differential pressure between the suction-side fluid chamber 71 and the cylinder chamber 60, so that the movable valve plate 75 is pressed to the cylinder chamber 60 as shown in FIG. 3, inhaling brake fluid within the suction-side fluid chamber 71 into the cylinder chamber 60.

In such a way, with reciprocating motion of the plunger 59, brake fluid is intermittently discharged from the auxiliary pump 25 to the main pump 24. In this embodiment, not only the main pump 24 and the auxiliary pump 25 are arranged in parallel with each other in the longitudinal direction of the camshaft 33, abut the annular groove 49 of the main pump 24 and the annular groove 68 of the auxiliary pump 25 are arranged at ends thereof near the camshaft 33, and the annular clearance 44 of the main pump 24 and the annular clearance 70 of the auxiliary pump 25 are arranged at the other ends thereof distant from the camshaft 33, thereby enabling rational layout of the auxiliary brake-fluid passage 20 in the casing 34, resulting in reduced size of the pump units.

Figure 5:
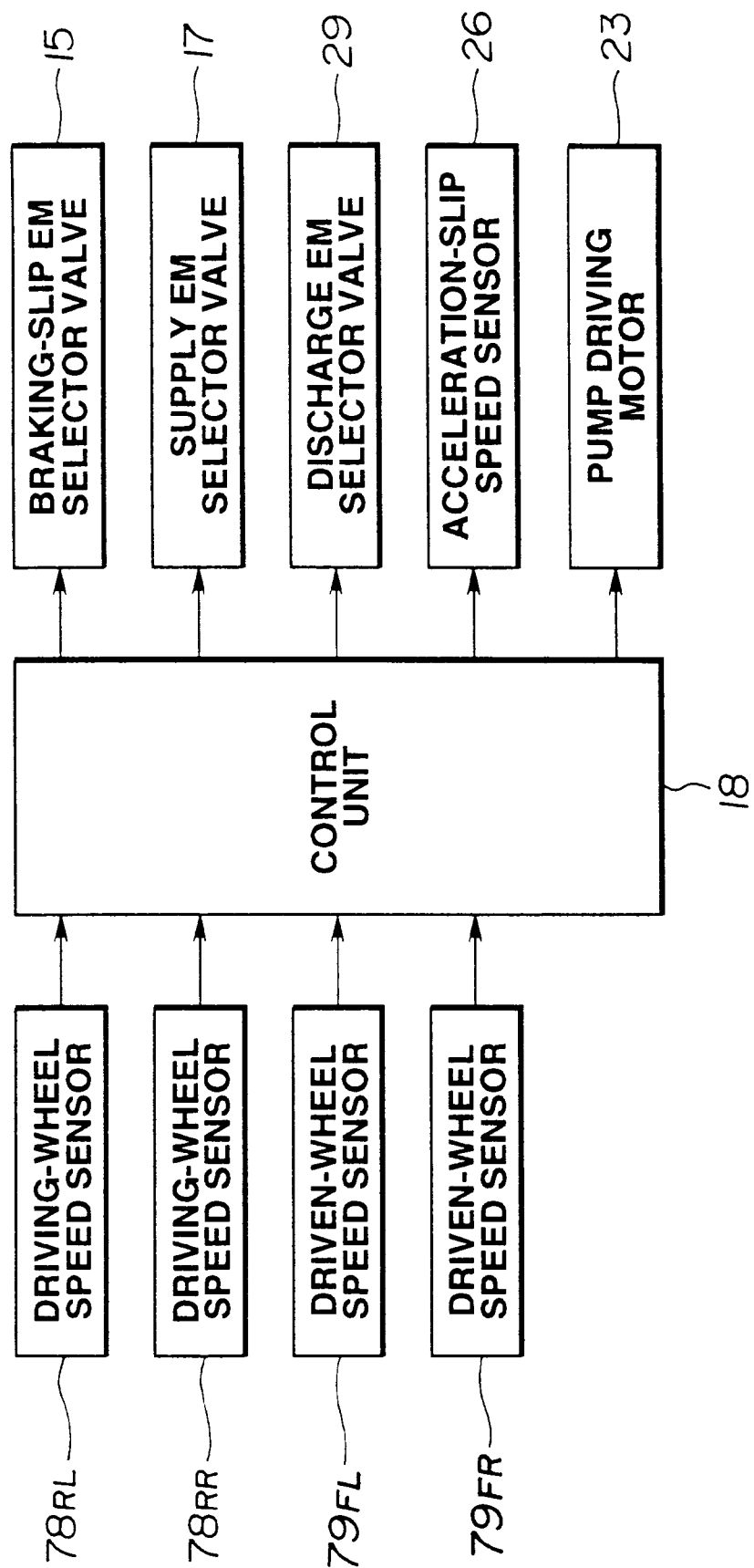
FIG. 5 is a block diagram showing a control block of the embodiment.

Referring to FIG. 5, in accordance with signals from the driving-wheel rotational-speed sensors $78_{RL}$, $78_{RR}$ (refer hereafter to as "78") which sense the rotational speeds of the rear wheels receiving the engine torque, driven-wheel rotational-speed sensors $79_{FL}$, $79_{FR}$, (refer hereafter to as "79"), which sense the rotational speeds of the front wheels that are rotated with movement of the vehicle relative to the road, etc., it is determined whether or not the wheels produce braking slip, or the rear wheels produce acceleration slip. In accordance with the result of this determination, switching is carried out with regard to turn-on and turn-off of the braking-slip selector valves 15 and the acceleration-slip selector valves 26, turn-on and turn-off of the supply selector valves 17 and the discharge selector valves 29 in accordance with the degree of slippage of the wheels, and operation of the main pump 24 and the auxiliary pump 25 in accordance with turn-on and turn-off of the pump driving motor 23, obtaining a desired characteristic.

In view of the fact that the determination method of the above braking and acceleration slips and the control method thereof are conventionally known, and have no direct relation to the present invention, only the operation after the above determination will be described below.

When the driver depresses the brake pedal 11, brake fluid within the master cylinder 12 is supplied to the main brake-fluid passages 13 through the braking-slip selector valves 15, then to the wheel cylinders 14 through the supply selector valves 17, thereby producing a braking force for the wheels. Moreover, brake-fluid pressure within the main brake-fluid passages 13 is gradually accumulated in the damper tanks 22 through the orifices 21.

When determining that any of the wheels produces braking slip in accordance with the signals out of the driving-wheel rotational-speed sensors 78 and the driven-wheel rotational-speed sensors 79, and a brake-fluid pressure within the corresponding wheel cylinder 14 should be thus reduced, the control unit 18 outputs a pressure reduction signal. Specifically, the supply selector valve 17 and the discharge selector valve 29 are turned on to shut off a brake-fluid pressure within the main brake-fluid passage 13 between the supply selector valve 17 and the wheel cylinder 14, and put the brake-fluid return passage 28 in communication. Moreover, the pump driving motor 23 is driven to operate the main pump 24 so that brake fluid within the wheel cylinder 14 is supplied from the main brake-fluid passage 13 to the brake-fluid return passage 28 through the discharge selector valve 29, which is mainly accumulated in the auxiliary reservoir tank 30, and partly in the damper tank 22 by the main pump 24. This allows a quick reduction in brake-fluid pressure within the wheel cylinder 14.

With driving of the pump drive motor 23, the auxiliary pump 25 is simultaneously operated together with the main pump 24, but runs idle since the acceleration-slip selector valve 26 is held in turn-off state to close the auxiliary brake-fluid passage 20.

Moreover, when determining that a brake-fluid pressure within the wheel cylinder 14 should be maintained at an actual value, the control unit 18 outputs a pressure maintenance signal. Specifically, the supply selector valve 17 is turned on to shut off a brake-fluid pressure within the main brake-fluid passage 13 between the supply selector valve 17 and the wheel cylinder 14, making the wheel cylinder 14 hermetic, thereby obtaining restrained brake-fluid pressure variations.

On the other hand, when determining that the driving wheels produce acceleration slip in accordance with the signals out of the driving-wheel rotational-speed sensors 78 and the driven-wheel rotational-speed sensors 79, and brake-fluid pressures within the wheel cylinder $14_{RL}$, $14_{RR}$, should be thus increased, the control unit 18 outputs a pressure increase signal. Specifically, the braking-slip selector valve 15 and the acceleration-slip selector valves 26 are turned on to close the former, and open the latter. Simultaneously, the pump driving motor 23 is driven to operate the main pump 24 and the auxiliary pump 25 so that brake fluid within the first reservoir tank 19 is supplied by the auxiliary pump 25 from the auxiliary brake-fluid passage 20 to the brake-fluid return passage 28 through the acceleration-slip selector valve 26, which is then supplied by the main pump 24 from the main brake-fluid passage 13 to the wheel cylinder $14_{RL}$, $14_{RR}$ through the supply selector valve 17. This enables restrained racing of the rear wheels, resulting in quick reduction in brake-fluid pressure within the wheel cylinder 14.

Figure 6:
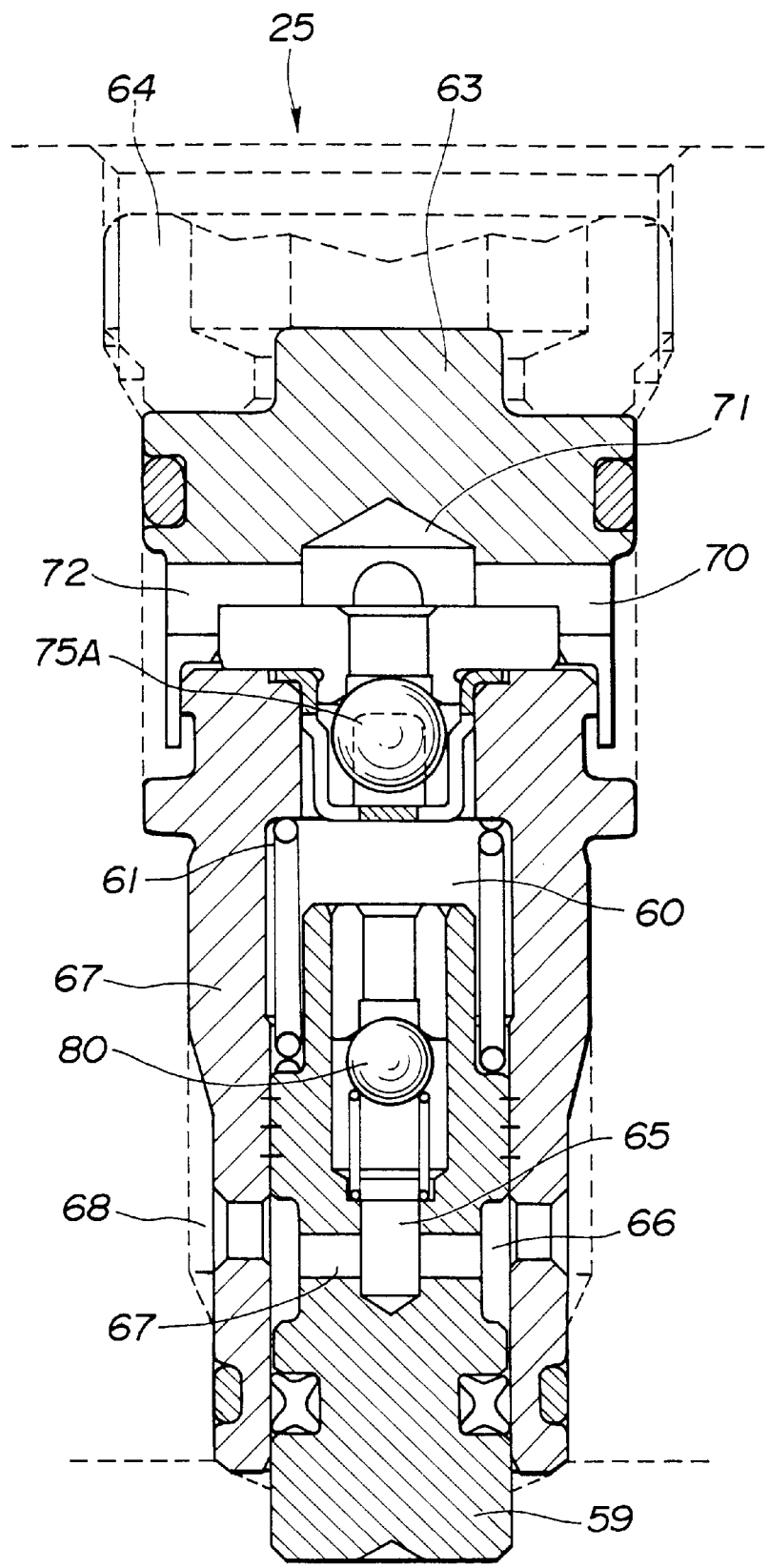
FIG. 6 is an enlarged section showing another example of an auxiliary pump.

Having described the present invention in connection with the preferred embodiment, it is noted that the present invention is not limited thereto, and various changes and modifications can be made without departing from the scope of the present invention. By way of example, referring to FIG. 6, the auxiliary pump 25 may include a valve ball 75A in place of the movable valve plate 75. Moreover, the auxiliary pump 25 may include a discharge valve 80 which can close the blind hole 65.

What is claimed is:

1. A pump unit, comprising:

a camshaft including first and second cams;

first and second pumps, each including a plunger;

first suction and discharge ports formed in said first pump, wherein said first suction port is arranged at an end of said first pump distant from said camshaft and said first discharge port is arranged at another end of said first pump near said camshaft; and second suction and discharge ports formed in said second pump, wherein said second suction port is arranged at an end of said second pump near said camshaft and said second discharge port is arranged at another end of said second pump distant from said camshaft, wherein said first and second pumps are arranged in parallel with each other along said camshaft so that said plungers of said first and second pumps contact said first and second cams of said camshaft, respectively, and wherein said first and second pumps are connected in series so that said first discharge port communicates with said second suction port.

2. A pump unit as claimed in claim 1, further comprising a casing housing said first and second pumps, said casing having a first communication passage communicating with said first suction port, a second communication passage communicating with said first discharge port and said second suction port, and a third communication passage communicating with said second discharge port.

3. A system for controlling a brake of a vehicle through master and wheel cylinders, comprising:

a main passage;

a reservoir tank communicating with said main passage;

an auxiliary passage having one end communicating with said main passage and another end communicating with said reservoir tank;

a return passage having one end communicating with said auxiliary passage and another end communicating with said main passage;

a first valve arranged in said main passage and connecting the master cylinder and the wheel cylinder;

a second valve arranged in said main passage between the wheel cylinder and said first valve;

a pump unit having:
 a camshaft including first and second cams;
 main and auxiliary pumps, each including a plunger, wherein said main pump is arranged in said auxiliary passage and discharges a brake fluid into said main passage, and wherein said auxiliary pump is arranged in said auxiliary passage between said main pump and said reservoir tank and discharges said brake fluid into said main pump;

first suction and discharge ports formed in said auxiliary pump, wherein said first suction port is arranged at an end of said auxiliary pump distant from said camshaft and said first discharge port is arranged at another end of said auxiliary pump near said camshaft; and second suction and discharge ports formed in said main pump, wherein said second suction port is arranged at an end of said main pump near said camshaft and said second discharge port is arranged at another end of said main pump distant from said camshaft, wherein said main and auxiliary pumps are arranged in parallel with each other along said camshaft so that said plungers of said main and auxiliary pumps contact said first and second cams of said camshaft, and wherein said main and auxiliary pumps are connected in series so that said first discharge port communicates with said second suction port;

a third valve arranged in said auxiliary passage between said auxiliary pump and said reservoir tank;

a fourth valve arranged in said return passage, wherein said return passage communicates with said auxiliary passage between said main pump and said auxiliary pump and communicates with said main passage between the wheel cylinder and said second valve;

a check valve arranged in said return passage at one end distant from said fourth valve, wherein said check valve prevents said brake fluid from flowing from said auxiliary pump to said return passage;

a motor connected to said pump unit, wherein said motor simultaneously drives said main and auxiliary pumps; and a control unit connected to said first to fourth valves and said motor, wherein said control unit controls said first to fourth valves and said motor.

4. A system as claimed in claim 3, wherein said pump unit further having a casing housing said main and auxiliary pumps, said casing being formed with a first communication passage communicating with said first suction port, a second communication passage communicating with said first discharge port and said second suction port, and a third communication passage communicating with said second discharge port.

* * * * *